United States Patent
Song et al.

(10) Patent No.: US 10,642,531 B2
(45) Date of Patent: May 5, 2020

(54) ATOMIC WRITE METHOD FOR MULTI-TRANSACTION

(71) Applicant: SAMSUNG ELECTRONICS CO., LTD., Suwon-si, Gyeonggi-Do (KR)

(72) Inventors: In Sung Song, Suwon-si (KR); Sang Hoon Choi, Seoul (KR); Moon Sang Kwon, Seoul (KR); Hyung Jin Im, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 16 days.

(21) Appl. No.: 14/263,613

(22) Filed: Apr. 28, 2014

(65) Prior Publication Data
US 2019/0227740 A1    Jul. 25, 2019

(30) Foreign Application Priority Data
Apr. 29, 2013 (KR) ................. 10-2013-0047775

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
See application file for complete search history.

(56) References Cited

U.S. PATENT DOCUMENTS

| | | | |
|---|---|---|---|
| 5,918,070 A | 6/1999 | Moon et al. | |
| 6,658,541 B2 | 12/2003 | Kitamura et al. | |
| 7,349,927 B2 | 3/2008 | Kanai et al. | |
| 8,055,859 B2 | 11/2011 | Kim et al. | |
| 8,259,502 B2 | 9/2012 | Honda | |
| 8,266,365 B2 | 9/2012 | Lasser | |
| 8,266,391 B2 | 9/2012 | Tomlin et al. | |
| 2010/0125702 A1 | 5/2010 | Lee et al. | |
| 2010/0281230 A1 | 11/2010 | Rabii et al. | |
| 2011/0161603 A1* | 6/2011 | Taillefer | G06F 9/466 711/150 |
| 2012/0079215 A1 | 3/2012 | Gray et al. | |
| 2012/0311288 A1 | 12/2012 | Callas et al. | |

(Continued)

FOREIGN PATENT DOCUMENTS

| | | |
|---|---|---|
| JP | 2001243209 A | 9/2001 |
| JP | 2002132554 A | 5/2002 |

(Continued)

OTHER PUBLICATIONS

Kubiatowicz, John et al., "Advanced Topics in Computer Systems," EECS 262a, Lecture 3, Filesystems, Sep. 5, 2012.

(Continued)

*Primary Examiner* — Eric Cardwell
(74) *Attorney, Agent, or Firm* — Volentine, Whitt & Francos, PLLC

(57) ABSTRACT

A method of operating a host includes defining transaction identifications for each one of multiple transactions in a multi-transaction, thereafter communicating atomic write data related to each transaction to a data storage device using the transaction ID, and storing the atomic write data in the data storage device using the transaction ID and an identifier.

20 Claims, 15 Drawing Sheets

(56) References Cited

U.S. PATENT DOCUMENTS

| | | | |
|---|---|---|---|
| 2012/0330894 A1 | 12/2012 | Slik | |
| 2013/0036136 A1 | 2/2013 | Horii | |
| 2013/0046924 A1 | 2/2013 | Adl-Tabatabai et al. | |
| 2013/0046925 A1 | 2/2013 | Adl-Tabatabai et al. | |
| 2013/0054915 A1 | 2/2013 | Chee | |
| 2014/0032491 A1* | 1/2014 | Neerincx | G06F 16/23 707/610 |
| 2014/0330767 A1* | 11/2014 | Fowler | G06F 9/466 707/607 |
| 2015/0019792 A1* | 1/2015 | Swanson | G06F 9/466 711/102 |
| 2016/0048354 A1* | 2/2016 | Walsh | G06F 12/0246 711/103 |

FOREIGN PATENT DOCUMENTS

| | | |
|---|---|---|
| KR | 10-0245807 B1 | 7/1998 |
| KR | 10-2011-0097937 A | 8/2011 |
| WO | WO2013-041852 A2 | 3/2013 |

OTHER PUBLICATIONS

Harizopoulos, Stavros et al., "Column-Oriented Database Systems," VLDB 2009 Tutorial.

Coburn, Joel Dylan, "Providing Fast and Safe Access to Next-Generation, Non-Volatile Memories," A dissertation submitted in partial satisfaction of the requirements for the degree Doctor of Philosophy in Computer Science (Computer Engineering), University of California, San Diego, 2012.

Coburn, Joel, et al., "NV-Heaps: Making Persistent Objects Fast and Safe with Next-Generation, Non-Volatile Memories," ASPLOS'11, Mar. 5-11, 2011, Newport Beach, California, USA.

Yun, Gi Tae et al., "On Extending InnoDB Double Write Buffer as Flash Memory SSD based Caches," pp. 8-16.

SNIA Solid State Storage Initiative PCIe SSD Task Force Meeting No. 6, Monday Jun. 18, 2012.

Jung, Sanghyuk et al., "Preemptive Garbage Collection Scheme for the Response Latency Minimization of NAND Flash Memories," pp. 398-404.

Hruby, Tomas, "(Not so) recent development in filesystems," University of Otago and World 45 Ltd., Mar. 18, 2008.

"Using DB2 9.7 Enterprise Edition and Red Hat Enterprise Linux Server 6.4 with KVM," IBM X3650 M4 with KVM, TPC Benchmark C, Full Disclosure Report, First Edition, Feb. 25, 2013.

Office Action From Korean Patent Office dated Jul. 18, 2019 From Corresponding Korean Application No. KR 10-2013-0047775.

Korean Notice of Allownce dated Jan. 23, 2020 Corresponding to Korean Application No. KR 10-2013-0047775.

* cited by examiner

Get_Transaction_ID()

Atomic_Multiple_Scatter_Write(Int *pLBA, int *pSctCnt, int nIOCount, int nTransactionID)

Get_Max Transaction_ID Count()

ATOMIC WRITE METHOD FOR MULTI-TRANSACTION

CROSS-REFERENCE TO RELATED APPLICATIONS

This application claims priority under 35 U.S.C. § 119(a) from Korean Patent Application No. 10-2013-0047775 filed on Apr. 29, 2013, the subject matter of which is hereby incorporated by reference.

BACKGROUND

Embodiments of the inventive concept relate to methods of communicating write data from a host to a data storage device. More particularly, embodiments of the inventive concept relate to methods of storing write data contained in a multi-transaction using an atomic write method that relies on transaction IDs for each transaction.

There are many different ways to communicate and store data in an electronic system. However, there are many problematic conditions that may arise during communication and storage of data. Thus, it is necessary to include measures in a data write method that provide for the reliability and/or recovery of the communicated data.

There are many different approaches to the execution of a write operation. A write operation is any operation that receives incoming "write data" and stores it in a given memory location. An atomic write operation is a particular type of write operation, wherein either all of the write data associated with the write operation is successfully written to the memory location, or none of the write data associated with the write operation is written (i.e., an "all or nothing" condition).

SUMMARY

According to certain embodiments of the inventive concept, there is provided a method of operating an electronic system including a host and a data storage device. The method includes; grouping a first transaction (TR) and a second TR into a multi-transaction, wherein the first TR associates a first set of atomic write data, and the second TR associates a second set of atomic write data, assigning a first TR identification (TR-ID) to the first TR and assigning a second TR-ID to the second TR, and thereafter, communicating the first set of atomic write data to the data storage device and storing the first set of atomic write data in a first storage area of the data storage device using the first TR-ID, and communicating the second set of atomic write data to the data storage device and storing the second set of atomic write data in the first storage area using the second TR-ID, and thereafter, atomically writing a combination of the first set of atomic write data and the second set of atomic write data from the first storage area to a second storage area different from the first storage area only after determining that the communication and storage of the first set of atomic data and the second set of atomic data were each successfully completed.

According to certain embodiments of the inventive concept, there is provided a method of operating an electronic system including a host and a data storage device. The method includes; grouping a first transaction (TR) and a second TR into a multi-transaction, wherein the first TR associates a first set of atomic write data, and the second TR associates a second set of atomic write data, assigning a first TR identification (TR-ID) to the first TR and assigning a second TR-ID to the second TR, and thereafter, communicating the first set of atomic write data to the data storage device, and storing each atomic write data in the first set of atomic write data in a first storage area of the data storage device together with the first TR-ID and an identifier indicating whether the atomic write data is a last communicated atomic write data in the first set of atomic write data, communicating the second set of atomic write data to the data storage device, and storing each atomic write data in the second set of atomic write data in the first storage area together with the second TR-ID and the identifier indicating whether the atomic write data is a last communicated atomic write data in the second set of atomic write data, and thereafter, atomically writing a combination of the first set of atomic write data and the second set of atomic write data from the first storage area to a second storage area different from the first storage area only after determining that the communication and storage of the first set of atomic data and the second set of atomic data were each successfully completed by referencing the respective identifiers for each atomic write data in the first set of atomic write data and the second set of atomic write data as stored in the first storage area.

BRIEF DESCRIPTION OF THE DRAWINGS

The above and other features and advantages of the inventive concept will become more apparent by describing in detail exemplary embodiments thereof with reference to the attached drawings in which:

FIGS. 5, 6 and 7 respectively illustrate exemplary application programming interface commands that may be used in conjunction with embodiments of the inventive concept;

DETAILED DESCRIPTION

Figure 1:
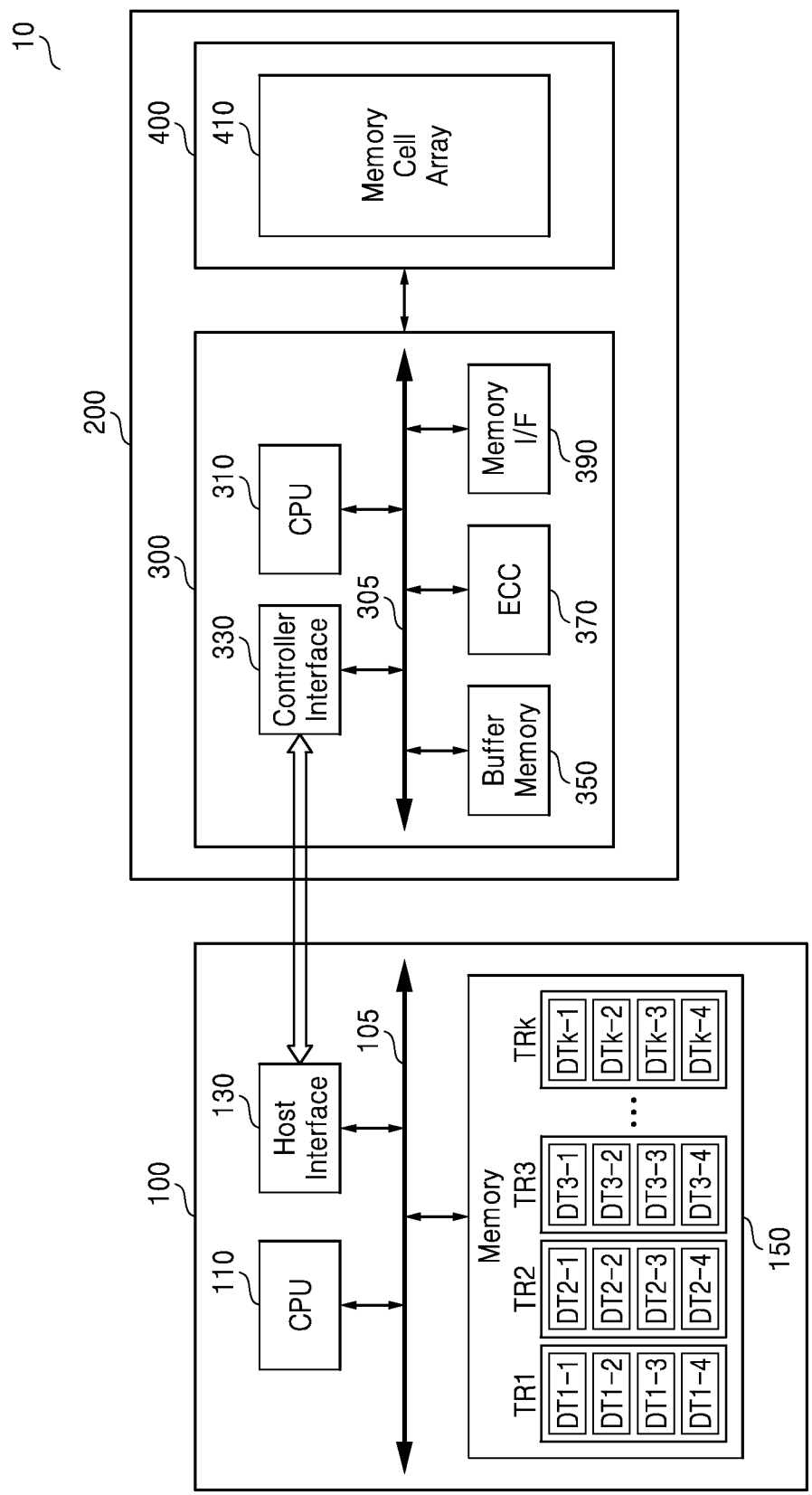
FIG. 1 is a block diagram of an electronic system according to certain embodiments of the inventive concept.

Certain embodiments of the inventive concept will now be described in some additional detail with reference to the accompanying drawings. However, the inventive concept may be embodied in many different forms and should not be construed as limited to only the illustrated embodiments. Rather, these embodiments are provided so that this disclosure will be thorough and complete, and will fully convey the scope of the inventive concept to those skilled in the art. Throughout the drawings and written description like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure (FIG.) 1 is a block diagram of an electronic system 10 according to certain embodiments of the inventive concept. The electronic system 10 generally comprises a host 100 and a data storage device 200.

Consistent with the inventive concept, the electronic system 10 is configured to communicate multiple "transactions" using an atomic write method. For example, the host 100 may have need to communicate a relatively large amount of write data to the data storage device 200. To accomplish this task, the bulk of write data is divided by the host, or some file system associated with the host, into a multiplicity of "atomic write data units" ("DTx-y" in FIG. 1, where 'x' is a positive integer equal to a number within a range (e.g., 1 to k in FIG. 1) of transactions (TRs) associated with the communication of the bulk write data, and 'y' is a positive integer equal to a number within a range (e.g., 1 to 4 in FIG. 1) of atomic write data units included in a particular transaction. Collectively, the definition and communication of a multiplicity transactions may be called a "multi-transaction", and each atomic write data unit is associated with an individually identifiable transaction within the multi-transaction. Accordingly, the electronic system 10 will assign a unique transaction identification (TR-ID) to each one of the transactions in a multi-transaction, and each transaction in the multi-transaction (e.g., TR1 through TRk) is communicated to, and stored by the data storage device 200 device according to its TR-ID.

In certain instances, the atomic write data included in each transaction may include data having non-consecutive addresses, and may be expressed in terms a logical block address (LBA) or range of LBAs.

Accordingly, the electronic system 10 of FIG. 1 may communicate the atomic write data DT1-1~DT1-4 through DTk-1~DTk-4 associated with transactions TR1 through TRk to the data storage device 200 using a scatter method, thereby preventing delays between respective transactions. That is, the electronic system 10 may ensure the coherent atomicity of the transactions TR1 through TRk of the multi-transaction, even where the constituent write data has non-consecutive addresses (e.g., LBAs).

The electronic system 10 of FIG. 1 may be implemented within a personal computer (PC), data server, database server, web server, network-attached storage (NAS), portable electronic device (e.g., a laptop computer, cellular phone, smart phone, table PC, mobile internet device (MID), personal digital assistant (PDA), enterprise digital assistant (EDA), digital still camera, digital video camera, portable multimedia player (PMP), personal navigation device, portable navigation device (PND), handheld game console, or e-book), etc.

The host 100 may be used to generate and assign a TR-ID to each of the transactions TR1 through TRk. In one possible approach, the host 100 may receive information indicating a maximum number transactions that may be communicated to (or effectively processed by) the data storage device 200. The host will then generate a corresponding number of TR-IDs in preparation of assigning a unique TR-ID to each transaction of a contemplated multi-transaction. Alternatively, the host 100 may request (and receive) a corresponding transaction ID for each transaction from the data storage device 200. Thereafter, the host 100 will communicate defied batches of atomic write data (e.g., DT1-1~DT1-4 through DTk-1~DTk-4) associated with multiple transactions (e.g., TR1 through TRk) to the data storage device 200 in accordance with a corresponding TR-ID.

In certain embodiments of the inventive concept, the host 100 may communicate data (i.e., TR-IDs and atomic write data) associated with the multi-transaction to the data storage device 200 using a conventionally defined application programming interface (API). Those skilled in the art will understand that one or more of numerous conventionally understood data communication protocol(s) may be implemented by the API.

Returning to FIG. 1, the host 100 is assumed to include a central processing unit (CPU) 110, a host interface 130, and a memory 150 interconnected via a bus 105. In certain embodiments of the inventive concept, the host 100 may be implemented using a commercially available application processor or a mobile application processor.

The CPU 110 may be a control circuit capable of controlling the overall operation of the host 100, and may be implemented as a single or multi-core processor. In this capacity, the CPU 110 may be used to control the definition and execution of the multi-transaction between the host 100 and data storage device 200.

The host interface 130 may be used to establish interface signaling properties (e.g., a data communication protocol) between the host 100 and data storage device 200 under the control of the CPU 110. For example, the host interface 130 may be used to establish one or more of a number of conventionally understood interface protocols such as a UHS (i.e., UHS-I or UHS-II), peripheral component interconnect express (PCI-E), or advanced technology attachment (ATA) SCSI or may be a protocol suitable for a universal serial bus (USB), a multimedia card (MMC), an enhanced small disk interface (ESDI) or an integrated drive electronics (IDE).

The memory 150 may be used to temporarily store the atomic write data DT1-1~DT1-4 through DTk-1~DTk-4 related with the transactions TR1 through TRk. For convenience' sake in the description, only four sets of the atomic write data DT1-1~DT1-4, DT2-1~DT2-4, DT3-1~DT3-4, and DTk-1~DTk-4 for the transactions TR1, TR2, TR3, and TRk, respectively, are illustrated in FIG. 1. The atomic write data DT1-1~DT1-4 through DTk-1~DTk-4 may data corresponding to non-consecutive addresses.

The memory 150 may be variously implemented using a volatile memory device (e.g., a dynamic random access memory (DRAM), static RAM (SRAM), thyristor RAM (T-RAM), zero capacitor RAM (Z-RAM), or twin transistor RAM (TTRAM)) and/or a non-volatile memory device (e.g., a read-only memory (ROM), electrically erasable programmable ROM (EEPROM), NOR flash memory, NAND flash memory, magnetic RAM (MRAM), spin-transfer torque MRAM (STT-MRAM), conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, molecular electronic memory device, or insulator resistance change memory). In certain embodiments of the inventive concept, the non-volatile memory device may be implemented using a hard disk drive (HDD) or a solid state drive (SSD).

During execution of the multi-transaction, the data storage device 200 will receive TR-IDs for the respective transactions TR1 through TRk, as well as the corresponding atomic write data DT1-1~DT1-4 through DTk-1~DTk-4 related with the transactions TR1 through TRk. Then, the data storage device 200 will write the atomic write data DT1-1~DT1-4 through DTk-1~DTk-4 and TR-IDs, along with an identifier for each "set" (i.e., a transaction-grouping) of the atomic write data to a first storage area of the data storage device 200. Here, each identifier may be used to indicate whether the communication, receipt and storing in the first storage of a complete set of atomic write data for a given transaction (e.g., atomic write data DT1-1~DT1-4 for TR1) was successful.

Once all transactions (e.g., TR1 through TRk) and corresponding write data (e.g., DT1-1~DT1-4 through DTk-1~DTk-4) have been successfully communicated and stored in the first storage area, the entirety of the bulk write data contained in the multi-transaction may be atomically written in a second storage area different from the first storage area using the TR-IDs and the identifiers. In this context, the term "atomically written" is used to define a data processing operation wherein the data storage device 200 writes (or programs) in an 'all-or-nothing manner' the entirety of the atomic write data DT1-1~DT1-4 through DTk-1~DTk-4 associated with the multi-transaction from the first storage area to the second storage area in units of transactions based on the TR-IDs and corresponding the identifiers.

In FIG. 1, the data storage device 200 comprises a memory controller 300 and a memory device 400. The data storage device 200 may be implemented as a database, an SSD, a universal flash storage (UFS), a flash USB drive, a secure digital (SD) card, an MMC, an embedded MMC (eMMC), a smart card, a memory card, or a redundant array of independent disks or redundant array of inexpensive disks (RAID), but the inventive concept is not restricted thereto. For instance, the data storage device 200 may be a flash memory based device including a flash memory controller.

The memory controller 300 may be used to control the communication of write data and related control information between the host 100 and data storage device 200. For instance, the memory controller 300 may be used to control receipt and storage of the write data in the multi-transaction as communicated from the host 100.

The memory controller 300 may include a CPU 310, a controller interface 330, a buffer memory 350, an error correction code (ECC) block 370, and a memory interface 390 interconnected by a bus 305. The CPU 310 may be used to control the writing (or programming) of write data to the memory device 400 and/or the reading of "read data" from the memory device 400. In this regard, the CPU 310 may control the receipt of TR-IDs for the respective transactions TR1 through TRk, the receipt of the atomic write data DT1-1~DT1-4 through DTk-1~DTk-4 related with the transactions TR1 through TRk, and the writing of the atomic write data DT1-1~DT1-4 through DTk-1~DTk-4 in the first storage area, the generating of the corresponding identifiers, and the writing of the atomic write data DT1-1~DT1-4 through DTk-1~DTk-4 to a second storage area in a memory cell array 410 of the memory device 400.

The controller interface 330 may be used to establish an interface or protocol between the host 100 and data storage device 200, and will therefore operate in cooperation with the host interface 130.

The buffer memory 350 may be used as a data buffer to temporarily store write data to be written to the memory device 400 or read data retrieved from the memory device 400. In this instance, the buffer memory 350 may be used to temporarily store the atomic write data DT1-1~DT1-4 through DTk-1~DTk-4 received from host 100. The buffer memory 350 may be implemented using a volatile memory as described above. Although the buffer memory 350 is illustrated in FIG. 1 as being implemented internal to the memory controller 300, it may alternately be implemented external to the memory controller 300.

The ECC block 370 may be used to encode incoming write data, and to correspondingly decode outgoing read data to enable a conventionally understood error correction and/or detection capability.

Finally, the memory interface 390 may be used to establish an interface or protocol between the memory device 400 and memory controller 300.

The memory device 400 may be implemented as the above-described using one or more volatile and/or non-volatile memory device(s).

Figure 2:
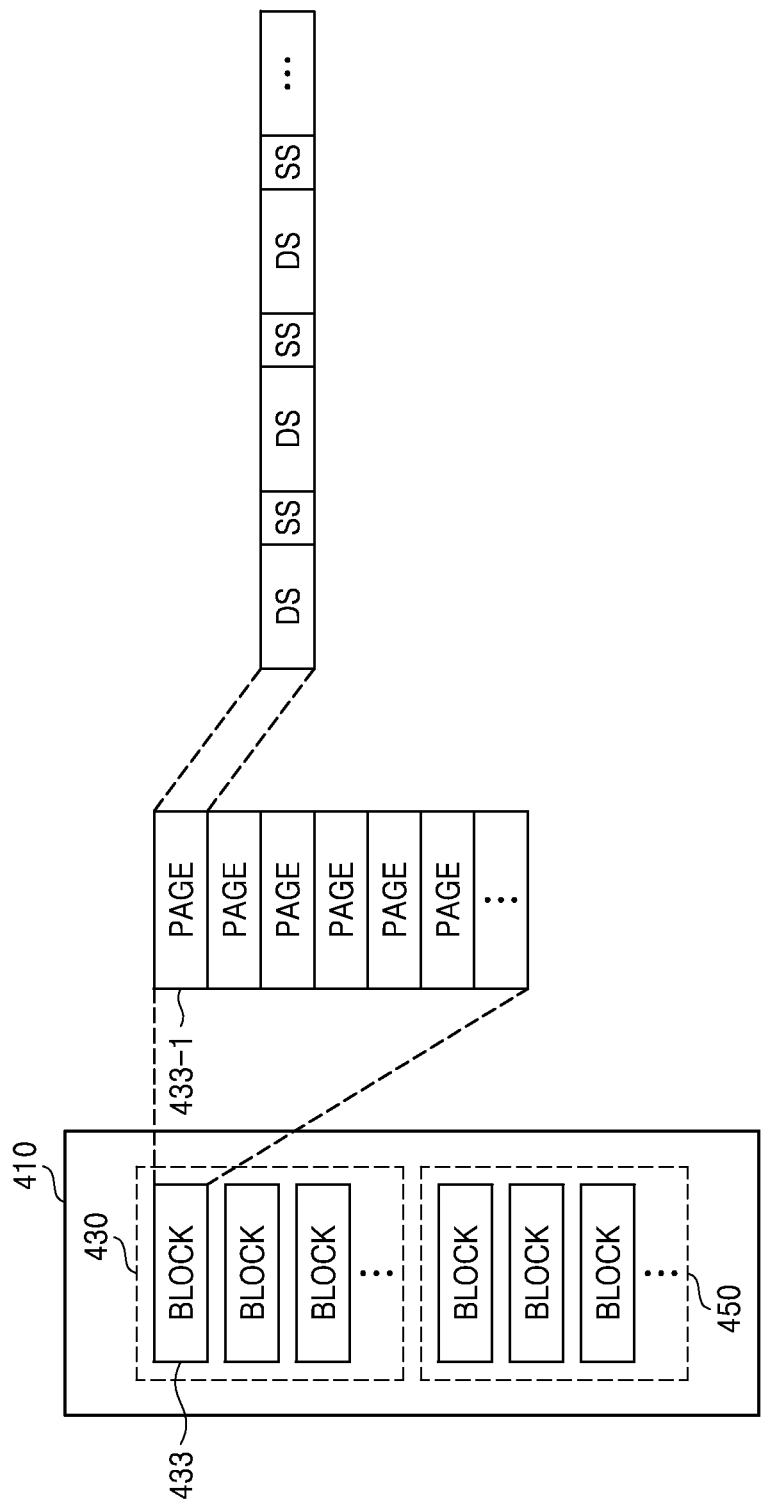
FIG. 2 is a conceptual diagram further illustrating the arrangement of the memory cell array of a memory device of FIG. 1.

FIG. 2 is a conceptual diagram further illustrating in one example a portion of the memory cell array 410 of FIG. 1. Referring to FIGS. 1 and 2, the memory cell array 410 of the memory device 400 may be arbitrarily divided into a first storage area 430 and a second storage area 450 configured to store single-bit or multi-bit data.

As will be is conventionally appreciated, each of the first and second storage areas 430 and 450 is divided into multiple blocks, each block being further divided into multiple pages. Only a single block 433 and a single page 433-1 are respectively illustrated in some additional detail in FIG. 2, as possible examples of the other blocks and pages.

In the illustrated example of FIG. 2, the page 433-1 is configured to include a data region or data sector (DS) to which write data (e.g., data that is part of the atomic write data DT1-1~DT1-4 through DTk-1~DTk-4) may be written, and a spare region or spare sector (SS) to which a TR-ID and an identifier may be written. Of course, the atomic write data DT1-1~DT1-4 through DTk-1~DTk-4 may be written to one or more pages of one or more blocks depending on the size of the atomic write data DT1-1~DT1-4 through DTk-1~DTk-4.

The atomic write data DT1-1~DT1-4 through DTk-1~DTk-4, corresponding TR-IDs, and identifiers may be written to the first storage area 430 under the control of the memory controller 300. Once successfully written to the first storage area 430, as indicated by the collection of TR-IDs and corresponding identifiers, the atomic write data DT1-1~DT1-4 through DTk-1~DTk-4, TR-IDs and identifiers may be atomically written to the second storage area 450 under the control of the memory controller 300. As a result, the atomic write data DT1-1~DT1-4 through DTk-1~DTk-4 written to the first storage area 430 may be atomically written to the second storage area 450 according to transaction units (i.e., in an all-or-nothing manner). Hence, "old data" stored in the (non-volatile) second storage area (i.e., data previously written to the second storage area 450 before complete execution of the multi-transaction) may be recovered until "new data" associated with the multi-transaction (e.g., DT1-1~DT1-4 through DTk-1~DTk-4) is written from the first storage area 430 to the second storage area 450.

Figure 3:
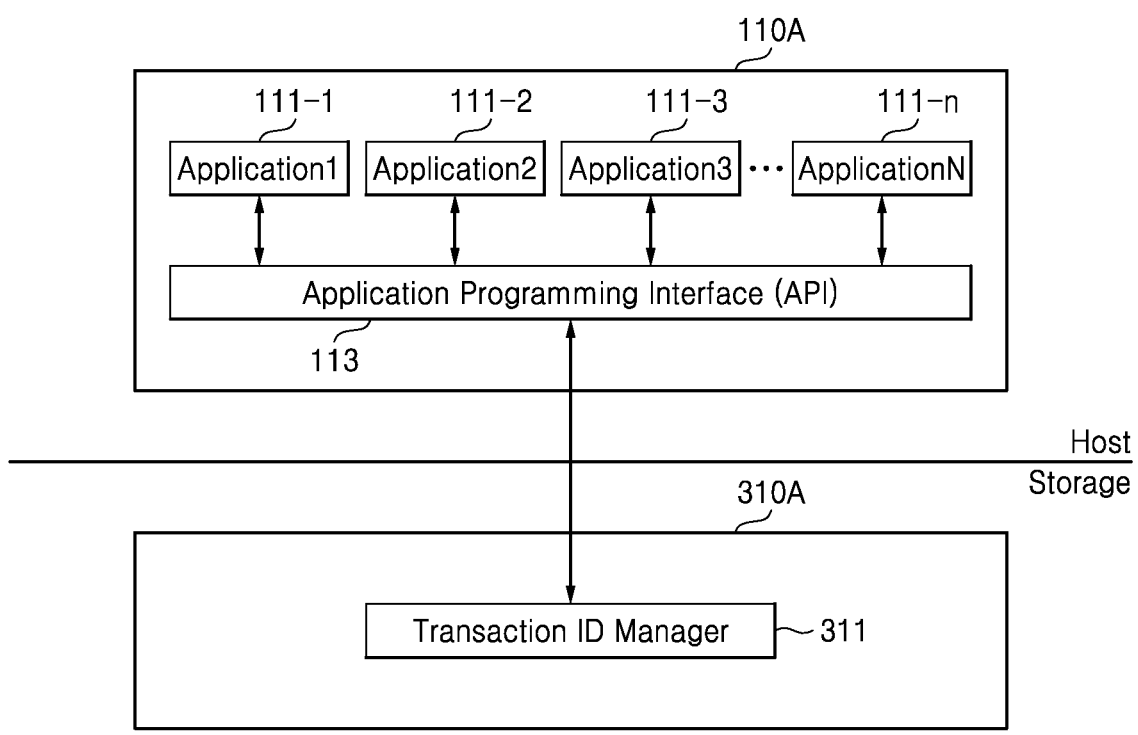
FIGS. 3 and 4 are respective conceptual diagrams further illustrating execution of the multi-transaction across a host/data storage device boundary according to certain embodiments of the inventive concept.

FIG. 3 is a conceptual diagram further illustrating execution of the multi-transaction across a host/data storage device boundary according to certain embodiments of the inventive concept. A CPU 110A illustrated in FIG. 3 is an example of the CPU 110 that may be included in the host 100 illustrated in FIG. 1, and a CPU 310A is an example of the CPU 310 included in the memory controller 300 illustrated in FIG. 1.

Referring to FIGS. 1 and 3, the CPU 110A may be used to define a TR-ID for each of the transactions TR1 through TRk. For instance, the CPU 110A may request a TR-ID for each of the transactions TR1 through TRk from a transaction ID manager 311 included in the data storage device 200 and accordingly receive the requested TR-ID from the transaction ID (TR-ID) manager 311.

As previously noted, the CPU 110A may be used to generally control the operation(s) of communicating the atomic write data DT1-1~DT1-4 through DTk-1~DTk-4 related to transactions TR1 through TRk from the host 100 to the data storage device 200 based on TR-IDs. That is, the host 100 (or CPU 110A) may return a corresponding TR-ID for each of the transactions TR1 through TRk to the data storage device 200 in conjunction with corresponding atomic write data.

As further illustrated in FIG. 3, the CPU 110A may include applications 111-1 through 111-n as well as API 113. The applications 111-1 through 111-n may be respectively executed using an operation system (OS) and during execution each application may individually define transactions TR1 through TRk as a work unit. During this processing, each of the applications 111-1 through 111-n may request a TR-ID for each transaction from the TR-ID manager 311 of the data storage device 200 via the API 113.

Figure 4:
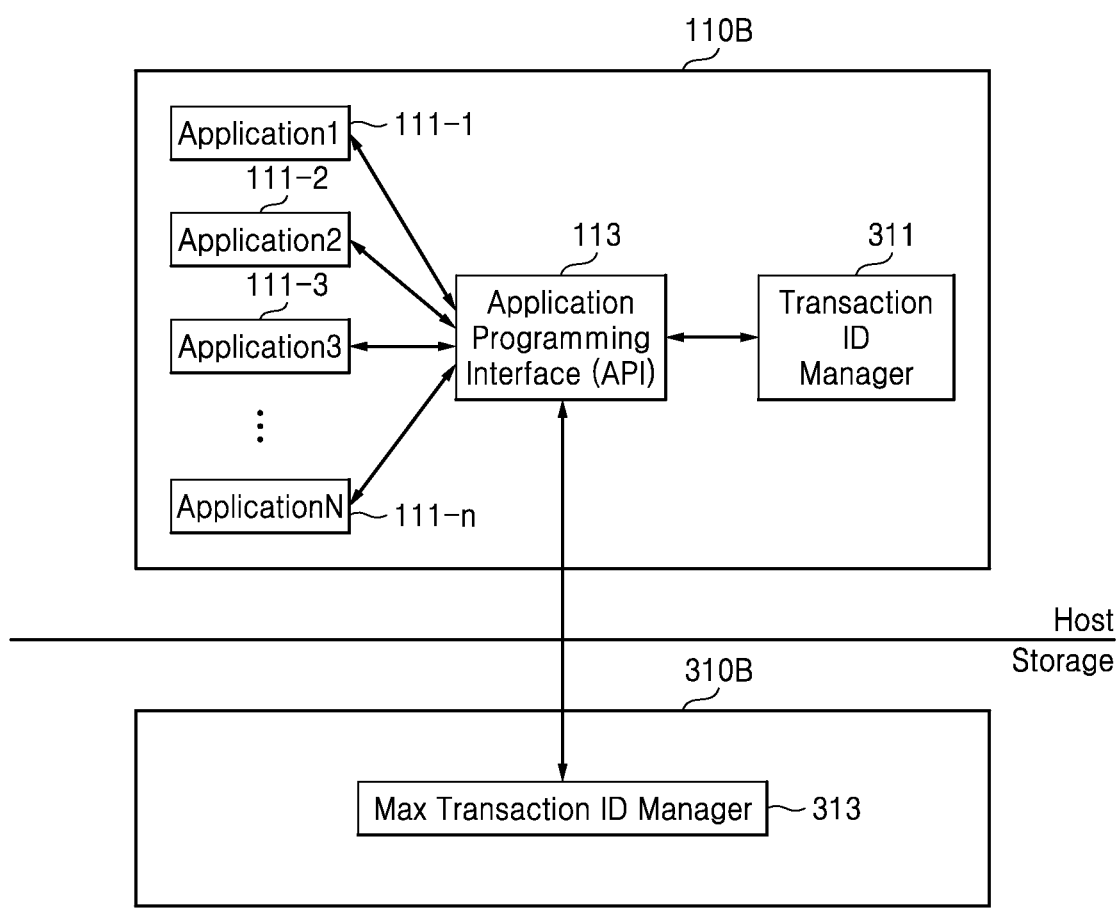

FIG. 4 is another conceptual diagram illustrating execution of the multi-transaction across a host/data storage device boundary according to certain other embodiments of the inventive concept. A CPU 110B illustrated in FIG. 4 is another example of the CPU 110 that may be included in the host 100 of FIG. 1, and a CPU 310B is another example of the CPU 310 that may be included in the memory controller 300 of FIG. 1.

Referring to FIGS. 1 and 4, the CPU 110B may be used to define a TR-ID for each transaction, TR1 through TRk. For instance, the CPU 110B may control operation(s) that generate a TR-ID for each of the transactions TR1 through TRk. The CPU 110B may generate the TR-ID for each of the transactions TR1 through TRk based on a maximum number of possible transactions that may be accommodated by the data storage device 200.

Here again, the CPU 110B of the host 100 may include applications 111-1 through 111-n and the API 113. However, in the embodiment illustrated in FIG. 4, the CPU 110B also include a TR-ID manager 311, such that each of the applications 111-1 through 111-n may request a TR-ID for each of the transactions TR1 through TRk from the TR-ID manager 311 implemented in the CPU 110B of the host 100 through the API 113. The TR-ID manager 311 may generate a TR-ID corresponding to each of the applications 111-1 through 111-n at the request and transmit the transaction ID to the corresponding one of the applications 111-1 through 111-n through the API 113.

The TR-ID manager 311 may receive information indicating a maximum number of transactions that may be accommodated by the data storage device 200 from a maximum (max) transaction ID manager 313, generate a TR-ID for each of currently available transactions based on the maximum number, and transmit the TR-ID to a corresponding one of the applications 111-1 through 111-n. Hence, the TR-ID manager 311 may only facilitate the definition of a maximum number of the transactions that can be accommodated in the data storage device 200.

Figure 5:
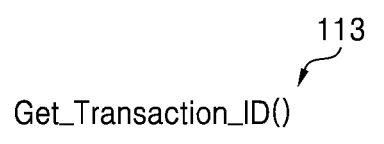

FIG. 5 illustrates one particular functional aspect (or specific command) that may be used by the API 113 in requesting a TR-ID according to certain embodiments of the inventive concept. Referring to FIGS. 1, 3, and 5, the applications 111-1 through 111-n may request the TR-ID using the API command 113 illustrated in FIG. 5.

Thus, the CPU 310A of the memory controller 300 may include the TR-ID manager 311 that generates TR-IDs. Although the transaction ID manager 311 is separately implemented in the CPU 310A of the memory controller 300 in certain embodiments, the TR-ID manager 311 may be implemented in a flash translation layer (FTL) of the CPU 310A in other embodiments.

The TR-ID manager 311 may communicate a TR-ID that is currently available for a transaction to any one of the applications 111-1 through 111-n upon request. As a result, the applications 111-1 through 111-n may transmit the atomic write data DT1-1~DT1-4 through DTk-1~DTk-4 related with the transactions TR1 through TRk to the data storage device 200 based on corresponding TR-IDs for each of the transactions TR1 through TRk. According to embodiments, the applications 111-1 through 111-n may request the data storage device 200 to perform an atomic write of the transactions TR1 through TRk including assigned TR-IDs, and may therefore communicate the atomic write data DT1-1~DT1-4 through DTk-1~DTk-4 related with the transactions TR1 through TRk to the data storage device 200.

FIG. 6 illustrates another particular functional aspect (or specific command) that may be used by the API 113 in requesting an atomic write according to certain embodiments of the inventive concept. Referring to FIGS. 1, 3, and 6, the applications 111-1 through 111-n may request that the data storage device 200 to perform an atomic write using the illustrated API command.

In the illustrated command syntax, "*pLBA" may be used to indicate a start address for each set of the atomic write data DT1-1~DT1-4 through DTk-1~DTk-4 related with the transactions TR1 through TRk; "*pSctCnt" may be used to indicate an address count, (e.g., a sector count for each set of the atomic write data DT1-1~DT1-4 through DTk- 1~DTk-4 related with the transactions TR1 through TRk); and "IOCount" may be used to indicate a number of data included in each of the transactions TR1 through TRk, (e.g., a count of each set of the atomic write data DT1-1~DT1-4 through DTk-1~DTk-4). The data storage device 200 may thereupon check for data last transmitted from the host 100 for each of the transactions TR1 through TRk using the value of "IOCount". In addition, "nTransactionID" may be used to indicate the TR-ID assigned to each of the transactions TR1 through TRk. Hence, an operating application 111-1 through 111-n may invoke the exemplary command illustrated in FIG. 6 in relation to each transaction in a multi-transaction.

Alternately, each one of the applications 111-1 through 111-n may communicate a TR-ID for each set of the atomic write data forming a transactions to the data storage device 200 together with the set of atomic write data. As a result, the applications 111-1 through 111-n need not request that data storage device 200 perform an atomic write through the API 113 since they transmit a TR-ID together with the atomic write data.

Figure 7:
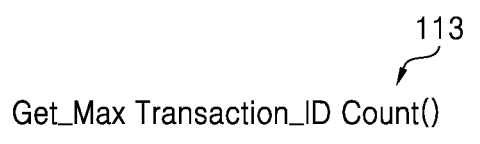

FIG. 7 illustrates another particular functional aspect (or specific command) that may be used by the API 113 for requesting a maximum number of transactions that may be accommodated by the data storage device 200 according to certain embodiments of the inventive concept. Referring to FIGS. 1, 4, and 7, the TR-ID manager 311 may request the maximum number of the transactions that may be accommodated by the data storage device 200 from the max TR-ID manager 313 via the API 113 using the command illustrated in FIG. 7.

The CPU 310B of the memory controller 300 may include the max TR-ID manager 313 that determines the maximum number of the transactions that may be accommodated by the data storage device 200 during a given time period. The max TR-ID manager 313 may then determine a maximum number of the transactions that may currently be accommodated by the data storage device 200 given available resources and communicate the determined maximum number to the max TR-ID manager 313.

The operation of the CPU 110B transmitting the atomic write data DT1-1~DT1-4 through DTk-1~DTk-4 to the data storage device 200 may be substantially the same as the operation of the CPU 110A illustrated in FIG. 3. The host 100, the CPU 110B, or each of the applications 111-1 through 111-n of the host 100 may return the TR-ID for each transaction to the TR-ID manager 311 after the transmission of the atomic write data corresponding to each transaction is complete.

Figure 8:
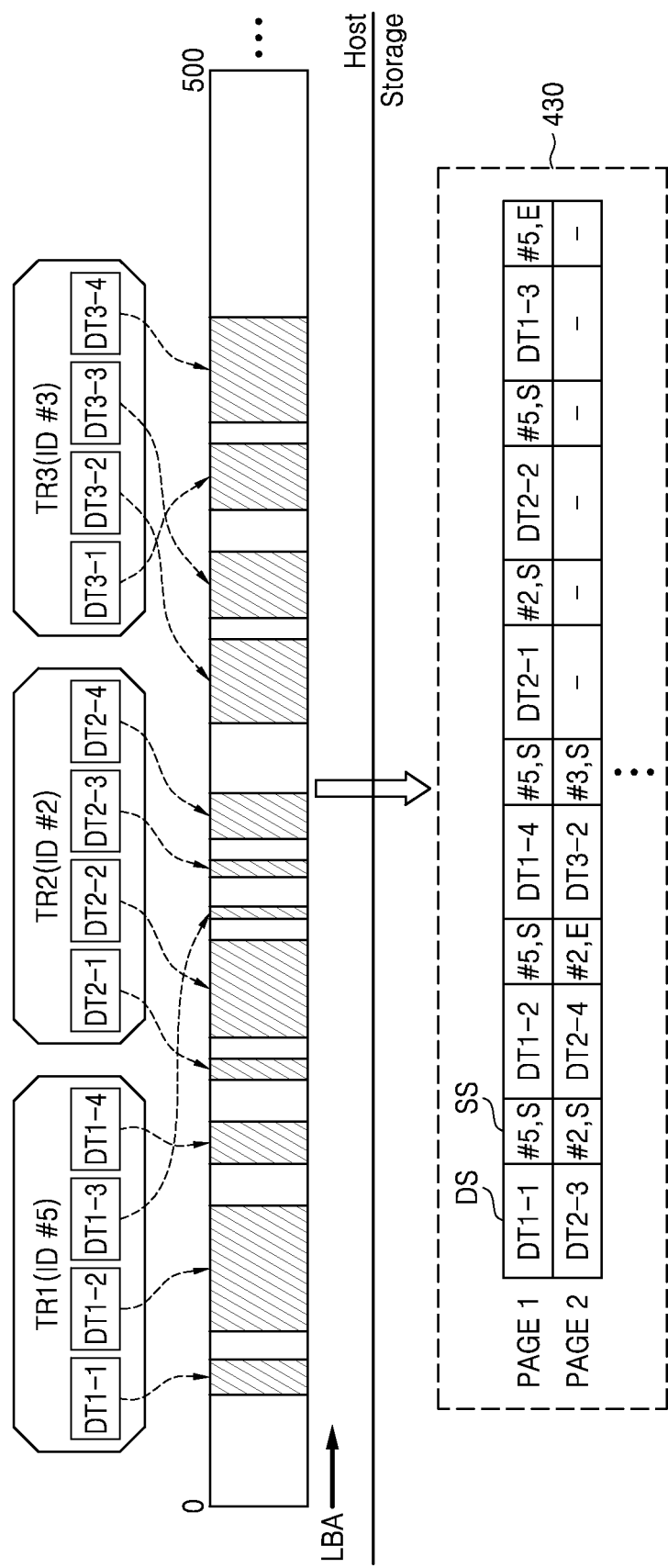
FIGS. 8 and 9 are conceptual diagrams for explaining an atomic write in multi-transaction according to some embodiments of the inventive concept.
Figure 9:
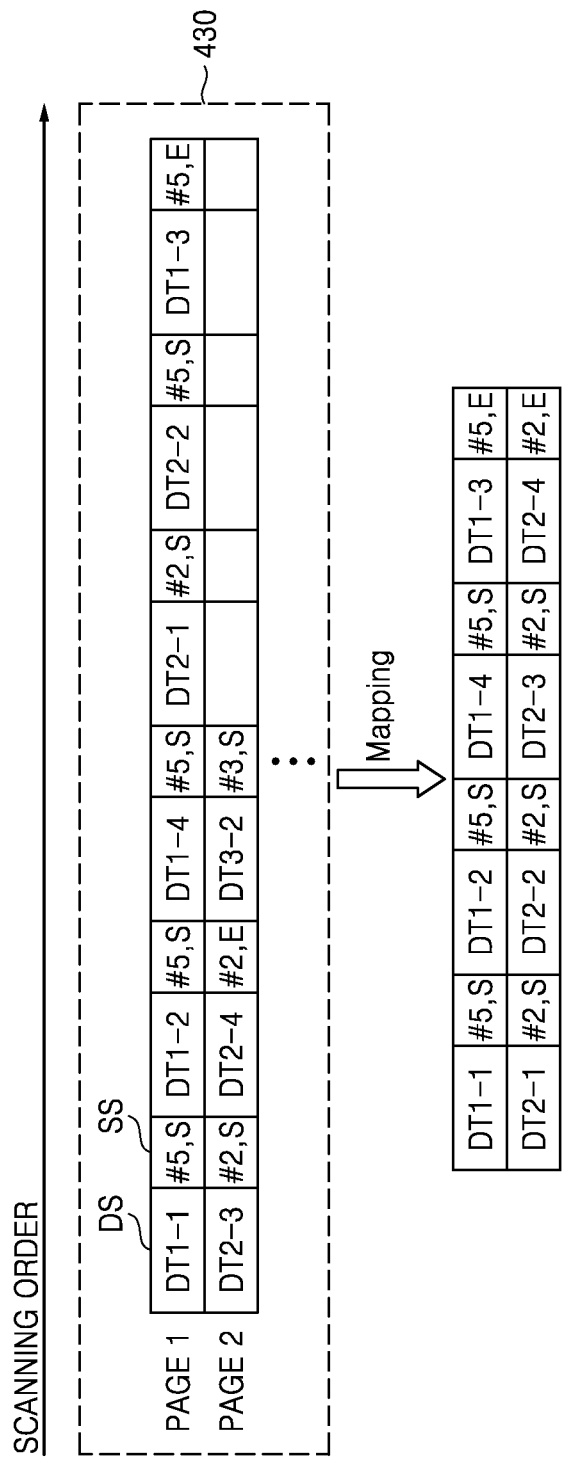

FIGS. 8 and 9 are respective conceptual diagrams further illustrating execution of a multi-transaction via an atomic writing operation according to certain embodiments of the inventive concept. For clarity of the description, the atomic write will be described using the data DT1-1~DT1-4 through DT3-1~DT3-4 related with the transactions TR1 through TR3, respectively, stored in the memory 150 of the host 100.

Referring to FIGS. 1 through 8, TR-IDs #5, #2, or #3 are defined by the host 100 or the data storage device 200 for each of transactions TR1, TR2 and TR3. Transaction TR1 is assigned the TR-ID #5, transaction TR2 is assigned TR-ID #2, and transaction TR3 is assigned the TR-ID #3.

The atomic write data DT1-1~DT1-4 through DT3-1~DT3-4 is assumed to be data having non-consecutive logical block addresses (LBAs), wherein the given LBA definition pattern may correspond to local block address or a logical sector address.

The host 100 then communicates the atomic write data DT1-1~DT1-4 through DT3-1~DT3-4 corresponding to the non-consecutive addresses LBA to the data storage device 200. For instance, the host 100 may transmit the atomic write data DT1-1~DT1-4 through DT3-1~DT3-4 related with the multi-transaction TR1 through TR3 to the data storage device 200 using a scatter method.

The data storage device 200 will then write the atomic write data DT1-1~DT1-4 through DT3-1~DT3-4, the transaction IDs #5, #2, and #3, and corresponding identifiers S and E for the atomic write data DT1-1~DT1-4 through DT3-1~DT3-4 to the first storage area 430. For instance, the data storage device 200 may write the atomic write data DT1-1~DT1-4 through DT3-1~DT3-4 to data sectors DS and the transaction IDs #5, #2, and #3 and the identifiers S and E to spare sectors SS.

The identifiers S and E may respectively be used to indicate an "in-progress" status and a "completion" status for transmission of atomic write data related to a given transaction. Although the identifiers are denoted by letters S and E in FIGS. 8 and 9, the identifiers S and E may signify data state bits (e.g., logic "1" and logic "0") indicating the completion or incompletion of the transmission of the atomic write data.

Hence, an identifier E for write data last communicated in a set of atomic write data for each of the transactions TR1 through TRk will indicate completion of each transmission. In contrast, an identifier S for the write data not-last communicated during a transaction will indicate that the transmission is still in progress and not yet complete.

The data storage device 200 may determine a last communicated write data for a transaction using (e.g.,) the "IOCount" value described in relation to the API command of FIG. 6, and accordingly write an identifier E to a corresponding spare sector SS.

The data storage device 200 may atomically write the atomic write data DT1-1~DT1-4 through DT3-1~DT3-4, which have been written to the first storage area 430, to the second storage area 450 based on the transaction IDs #5, #2, and #3 and the identifiers S and E in the multi-transaction illustrated in FIG. 8.

Referring to FIG. 9, a case is illustrated that assumes an unexpected (or abnormal) power-off occurs after the data DT3-3 is written to the first storage area 430. Referring to FIGS. 1 and 9, when abnormal power-off occurs after the data storage device 200 writes data up to DT3-3 to the first storage area 430 in the order in which the data have been transmitted, the data storage device 200 may scan the data from DT1-1 to DT3-3 in the order in which the data have been written to the first storage area 430 during an abnormal power-off recovery operation.

The data storage device 200 may distinguish data for each of the transactions TR1 through TR3 using the transaction IDs #5, #2, and #3 and may construct or build a map for only the transactions TR1 and TR2 for which the transmission has been completed, as shown in FIG. 9, using the identifiers S and E to distinguish complete and in-progress data communications.

As part of the abnormal power-off recovery operation for example, the data storage device 200 may atomically write all of the write data DT1-1~DT1-4 and DT2-1~DT2-4 related with the transactions TR1 and TR2 in the map to the second storage area 450, thereby recovering at least some of the new data previously written to the first storage area 430 by completed transactions. However, the data storage device 200 will not atomically write any portion of the write data DT3-1~DT3-4 related to the non-completed transaction TR3 to the second storage area 450, thereby leaving any old data previously written to the second storage area 450 in this regard as is. Thereafter, the transaction TR3 may be noted and again communicated from the host 100 following execution of the abnormal power-off recovery operation. In this manner, the data storage device 200 may atomically write in an all or nothing approach the atomic write data associated with only completed transactions from the first storage area 430 to the second storage area 450 based on assigned TR-IDs (e.g., #5, #2, and #3) and corresponding identifiers (e.g., S and E) during an abnormal power-off recovery operation.

Figure 10:
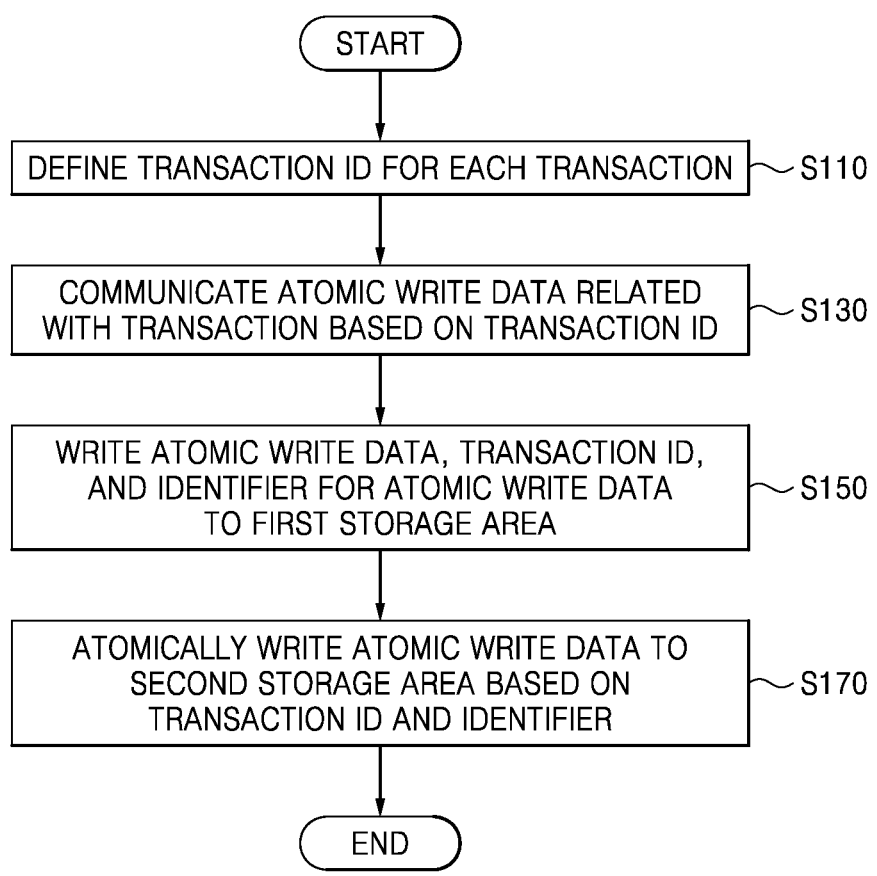
FIG. 10 is a flowchart summarizing a method of operating a system according to some embodiments of the inventive concept.

FIG. 10 is a flowchart summarizing a method of operating the system 10 of FIG. 1 according to embodiments of the inventive concept.

Referring collectively to FIGS. 1 through 10, the method begins by defining a TR-ID for each transactions in a multi-transaction (S110).

The host 100 may then communicate the atomic write data DT1-1~DT1-4 through DTk-1~DTk-4 related to transactions TR1 through TRk to the data storage device 200 using the corresponding TR-IDs (S130).

The data storage device 200 may then receive the atomic write data DT1-1~DT1-4 through DTk-1~DTk-4 related with the transactions TR1 through TRk from the host 100, and write the atomic write data DT1-1~DT1-4 through DTk-1~DTk-4, TR-IDs, and corresponding identifiers to the first storage area 430 of the data storage device 200 (S150).

Then, the data storage device 200 may atomically write the atomic write data DT1-1~DT1-4 through DTk-1~DTk-4 stored in the first storage area 430 to the second storage area 450 using the TR-IDs and the identifiers (S170).

Figure 11:
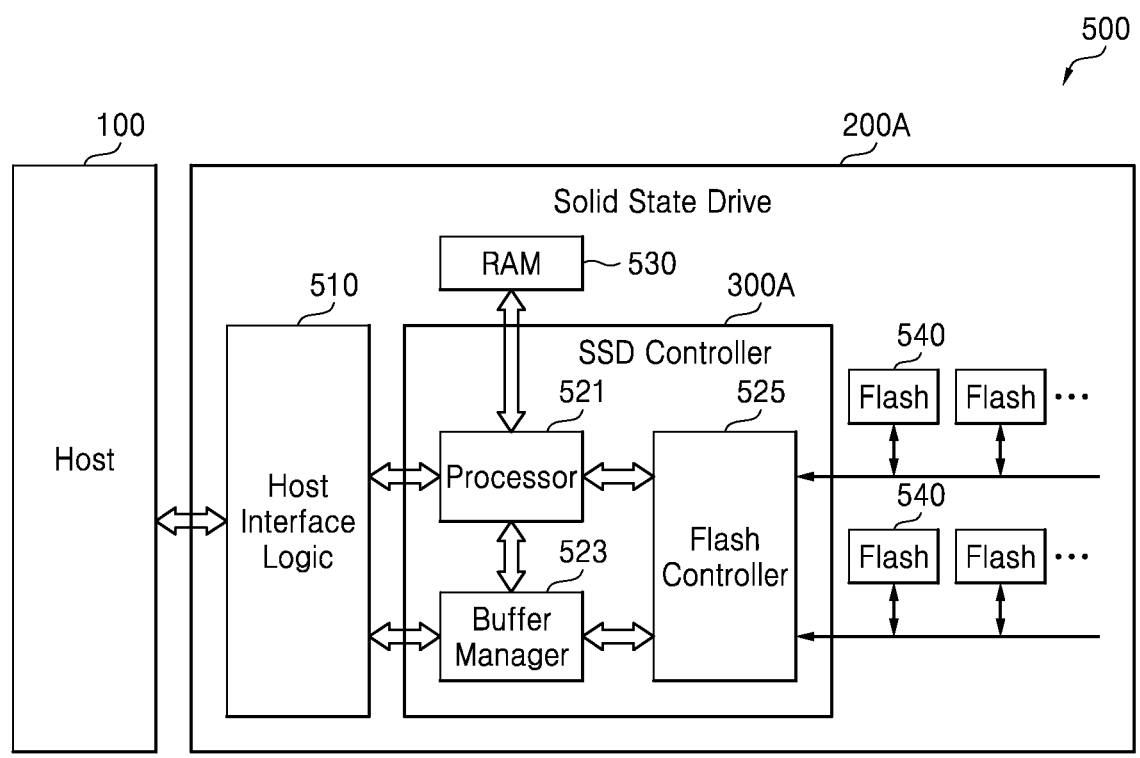
FIGS. 11, 12, 13, 14 and 15 are respective block diagrams of electronic systems according to various embodiments of the inventive concept.

FIG. 11 is a block diagram of an electronic system 500 according to certain embodiments of the inventive concept. The electronic system 500 includes the host 100 and a solid state drive (SSD) 200A. The SSD 200A includes a host interface logic 510, an SSD controller 300A, a storage device 530, and a plurality of flash memory devices 540.

The storage device 530 may be implemented as the above-described volatile memory device or the above-described non-volatile memory device. The host interface logic 510 interface data between the host 100 and the SSD controller 300A. The SSD controller 300A controls data transmitted among the host interface logic 510, the storage device 530, and the flash memory devices 540.

The SSD controller 300A includes a processor 521, a buffer manager 523, and a flash controller 525. The processor 521 controls the overall operation of the SSD controller 300A. For instance, the processor 521 controls the operation of the buffer manager 523 and the operation of the flash controller 525. The buffer manager 523 controls buffering of data transmitted between the host interface logic 510 and the flash controller 525. The flash controller 525 controls data transmitted between the flash memory devices 540 and the buffer manager 523. The storage areas 430 and 450 may be implemented in different flash memory devices, respectively, among the flash memory devices 540.

Figure 12:
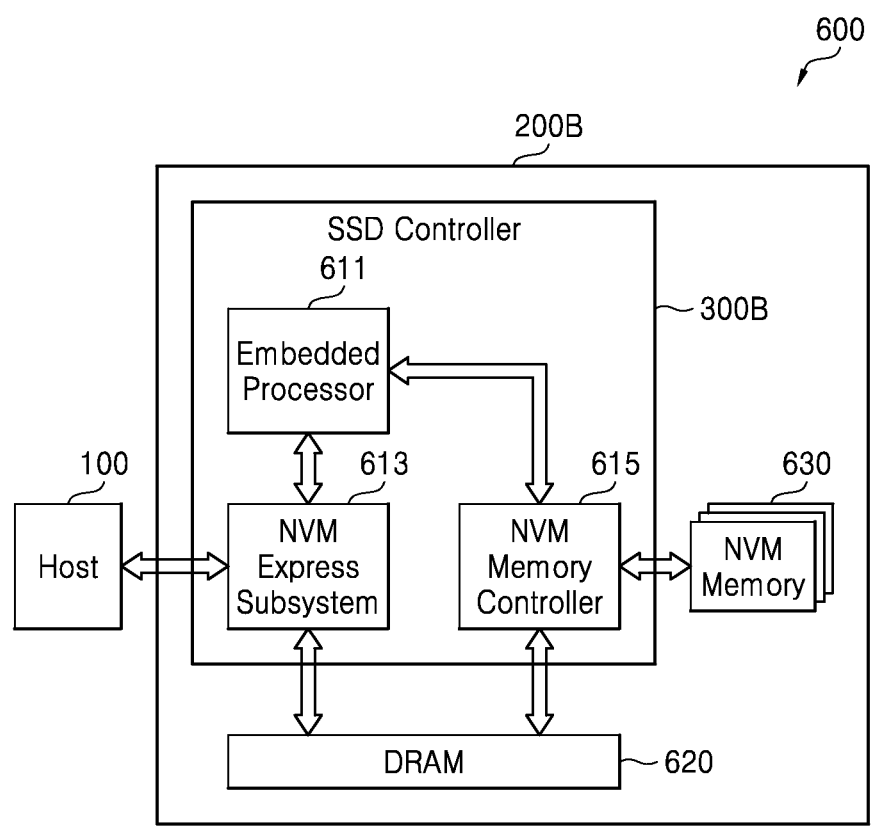

FIG. 12 is a block diagram of an electronic system 600 according to other embodiments of the inventive concept. Referring to FIG. 12, the electronic system 600 includes the host 100 and a data storage device 200B. The data storage device 200B includes an SSD controller 300B supporting non-volatile memory express (NVMe), a storage device 620, and a plurality of non-volatile memory (NVM) devices 630.

The SSD controller 300B includes an embedded processor 611, an NVMe subsystem 613, and an NVM controller 615. The embedded processor 611 controls the operation of the NVMe subsystem 613 and the operation of the NVM controller 615.

The NVMe subsystem 613 receives and processes the atomic write data DT1-1~DT1-4 through DTk-1~DTk-4 related with the transactions TR1 through TRk output from the host 100. The NVMe subsystem 613 and the NVM controller 615 may access the storage device 620. The storage device 620 may be implemented as a volatile memory such as DRAM.

The storage areas 430 and 450 may be implemented in different NVM devices, respectively, among the NVM devices 630. According to the control of the NVM controller 615, the atomic write data DT1-1~DT1-4 through DTk-1~DTk-4 related with the transactions TR1 through TRk, which have been written to the storage area 430, may be atomically written to the storage area 450, i.e., at least one of the NVM devices 630, which is different from the storage area 430.

Figure 13:
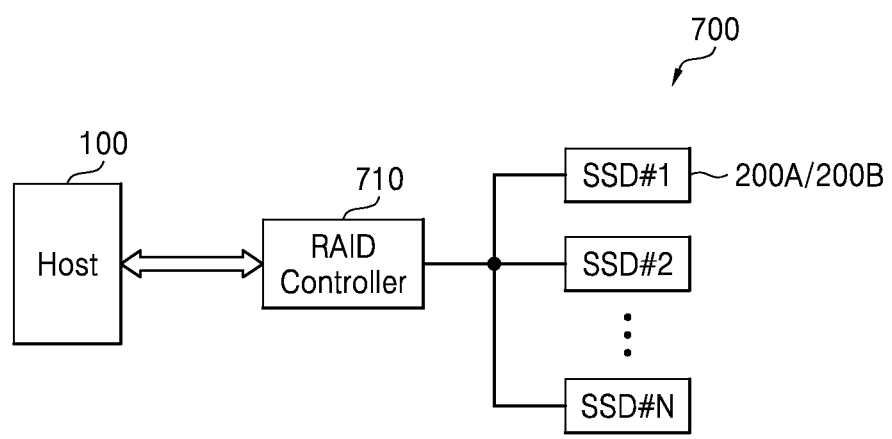

FIG. 13 is a block diagram of an electronic system 700 according to still other embodiments of the inventive concept. Referring to FIG. 13, the electronic system 700 includes the host 100, a RAID controller 710, and a plurality of SSDs 200A or 200B.

The storage area 430 may be implemented in at least one of the SSDs 200A or 200B. The atomic write data DT1-1~DT1-4 through DTk-1~DTk-4 related with the transactions TR1 through TRk, which have been written to the storage area 430, may be atomically written to the storage area 450, i.e., at least one of the SSDs 200A or 200B, which is different from the storage area 430.

Figure 14:
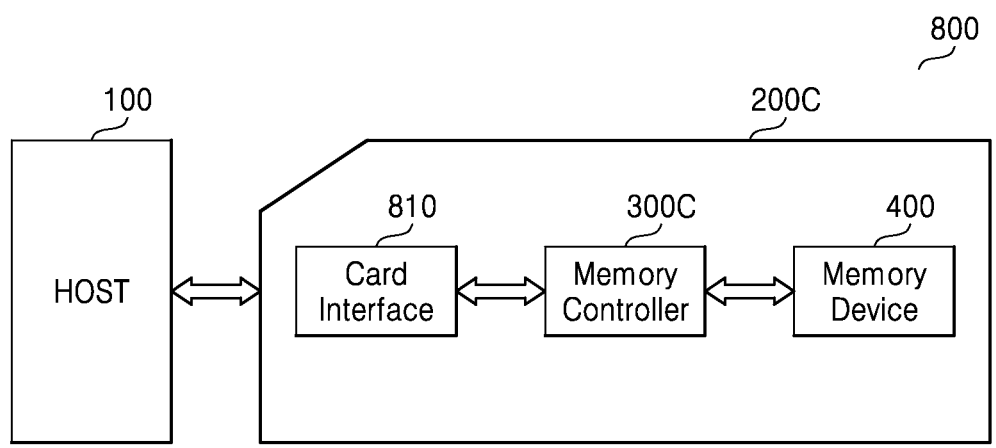

FIG. 14 is a block diagram of an electronic system 800 according to yet other embodiments of the inventive concept. Referring to FIG. 14, the electronic system 800 may include the host 100 and a memory card 200C. For instance, the memory card 200C may be a smart card, a USB flash drive, a multi-media card (MMC), a SD (secure digital) card, an eMMC, or a universal flash storage (UFS).

The memory card 200C may include a card interface 810 communicating with the host 100, a NVM device 400, and a memory controller 300C controlling the data communication between the card interface 810 and the NVM device 400.

The card interface 810 may be an SD card interface or an MMC interface, but the inventive concept is not restricted to the current embodiments. The card interface 810 may interface the host 100 and the memory controller 300C for data exchange according to a protocol of the host 100.

Alternatively, the card interface 810 may support a USB protocol or an inter-chip (IC)-USB protocol. Here, the card interface 810 may indicate a hardware supporting a protocol used by the host 100, software installed in the hardware, or a signal transmission mode.

Figure 15:
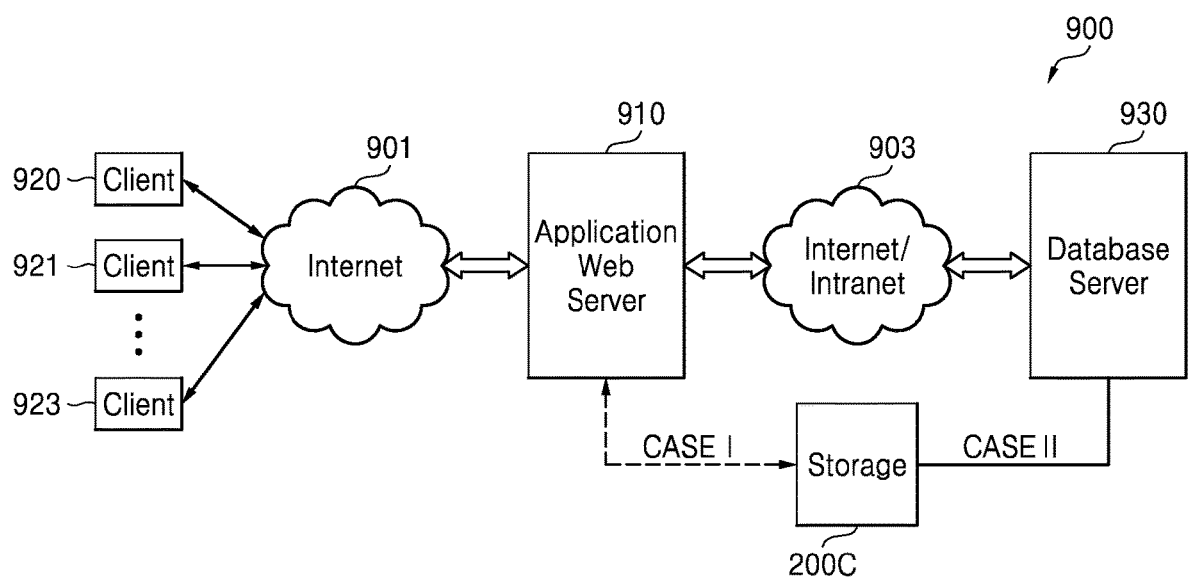

FIG. 15 is a block diagram of an electronic system 900 according to still other embodiments of the inventive concept. Referring to FIG. 15, the electronic system 900 includes an application web server 910, a plurality of clients 920 through 923, and a data storage device 200C. The application web server 910 and the clients 920 through 923 form a communication network through an internet 901. The application web server 910 may function as the host 100 and the data storage device 200C may function as the data storage device 200.

In a first case CASEI, the application web server 910 may transmit atomic write data related with a transaction to a first storage area in the data storage device 200C and the data storage device 200C may atomically write the atomic write data, which has been stored in the first storage area, to a second storage area different from the first storage area in the data storage device 200C based on a transaction ID and an identifier of the atomic write data.

In a second case CASEII, the electronic system 900 may also include a database server 930. In this case, the application web server 910 and the database server 930 may be connected with each other through an internet or intranet 903.

The database server 930 may function as the host 100 and the data storage device 200C may function as the data storage device 200. Accordingly, the database server 930 may transmit atomic write data related with a transaction to the first storage area in the data storage device 200C and the data storage device 200C may atomically write the atomic write data, which has been stored in the first storage area, to a second storage area different from the first storage area in the data storage device 200C based on a transaction ID and an identifier of the atomic write data.

As described above, according to various embodiments of the inventive concept, atomic write data contained in multiple transactions of a multi-transaction may be effective communicated and temporarily stored in a data storage device using a transaction ID assigned to each transaction. Thereafter, following successful communication and temporary storage of write data associated with at least one of the transactions, the corresponding atomic write data may be atomically written to a different storage area in transaction units using the transaction IDs and corresponding identifiers.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A method of operating an electronic system including a host and a data storage device, the method comprising:
grouping a first transaction (TR) and a second TR into a multi-transaction, wherein the first TR associates a first set of atomic write data, and the second TR associates a second set of atomic write data;
assigning a first TR identification (TR-ID) to the first TR and assigning a second TR-ID to the second TR; and thereafter,
communicating the first set of atomic write data to the data storage device and storing the first set of atomic write data in a first storage area of the data storage device together with the first TR-ID and respective first identifiers indicative of completion status of transmission of the first set of atomic write data, and communicating the second set of atomic write data to the data storage device and storing the second set of atomic write data in the first storage area together with the second TR-ID and respective second identifiers indicative of completion status of transmission of the second set of atomic write data; and thereafter,
atomically writing a combination of the first set of atomic write data and the second set of atomic write data from the first storage area to a second storage area different from the first storage area only after determining that the communicating and storing of the first set of atomic data and the second set of atomic data were each successfully completed based on the first and second identifiers.

2. The method of claim 1, further comprising:
executing a first application program on the host, such that the executing of the first application program defines the first set of atomic write data for the first TR;
by operation of the host, requesting a TR-ID from a transaction (TR) manager of the data storage device for the first TR; and
receiving the TR-ID in the host from the TR manager, and then assigning the received TR-ID as the first TR-ID to the first TR by operation of the host.

3. The method of claim 2, wherein the host comprises an application programming interface (API), and the requesting the TR-ID for the first TR from the TR manager is made through the API.

4. The method of claim 3, wherein the API includes a single unique command that is invoked by the host to request the TR-ID for the first TR from the TR manager.

5. The method of claim 2, further comprising:
executing a second application program on the host, such that the executing of the second application program defines the second set of atomic write data for the second TR;
by operation of the host, requesting another TR-ID from the TR manager for the second TR; and
receiving the another TR-ID in the host from the TR manager, and then assigning the received another TR-ID as the second TR-ID to the second TR by operation of the host.

6. The method of claim 5, wherein the host comprises an application programming interface (API), and the requesting the another TR-ID for the second TR from the TR manager is made through the API.

7. The method of claim 6, wherein the first application program and the second application program are different application programs.

8. The method of claim 1, further comprising:
executing a first application program on the host, such that the executing of the first application program defines the first set of atomic write data for the first TR; and
by operation of the host, requesting a TR-ID from a transaction (TR) manager in the host for the first TR, and then assigning the TR-ID provided by the TR manager as the first TR-ID to the first TR by operation of the host.

9. The method of claim 8, wherein the host comprises an application programming interface (API), and the requesting the TR-ID for the first TR from the TR manager is made through the API.

10. The method of claim 9, wherein the API includes a single unique command that is invoked by the host to request the TR-ID for the first TR from the TR manager.

11. The method of claim 8, further comprising:
executing a second application program on the host, such that the executing of the second application program defines the second set of atomic write data for the second TR; and
by operation of the host, requesting another TR-ID from the TR manager for the second TR and then assigning the another TR-ID provided by the TR manager as the second TR-ID to the second TR by operation of the host.

12. The method of claim 11, wherein the host comprises an application programming interface (API), and the requesting the another TR-ID for the second TR from the TR manager is made through the API.

13. The method of claim 12, wherein the first application program and the second application program are different application programs.

14. A method of operating an electronic system including a host and a data storage device, the method comprising:

grouping a first transaction (TR) and a second TR into a multi-transaction, wherein the first TR associates a first set of atomic write data, and the second TR associates a second set of atomic write data;

assigning a first TR identification (TR-ID) to the first TR and assigning a second TR-ID to the second TR; and thereafter, communicating the first set of atomic write data to the data storage device and storing the first set of atomic write data in a first storage area of the data storage device using the first TR-ID, and communicating the second set of atomic write data to the data storage device and storing the second set of atomic write data in the first storage area using the second TR-ID; and thereafter, atomically writing a combination of the first set of atomic write data and the second set of atomic write data from the first storage area to a second storage area different from the first storage area only after determining that the communicating and storing of the first set of atomic data and the second set of atomic data were each successfully completed;

executing a first application program on the host, such that executing of the first application program defines the first set of atomic write data for the first TR; and by operation of the host, requesting a TR-ID from a transaction (TR) manager operating on the host for the first TR, and then assigning the first TR-ID to the first TR by operation of the host, wherein the host comprises an application programming interface (API), and the requesting the TR-ID for the first TR from the TR manager is made through the API, and wherein the data storage device comprises a maximum TR-ID manager, and the method further comprises by operation of the host via the API, requesting from the maximum TR-ID manager a maximum number of transactions (TRs) that may currently be accommodated by the data storage device during execution of the multi-transaction; and thereafter, additionally grouping the TRs with the first and second TRs into the multi-transaction only so long as each additionally grouped TR of the TRs does not cause a number of TRs grouped in the multi-transaction to exceed the maximum number of TRs.

15. The method of claim 14, wherein the API includes a single unique command that is invoked by the host to request the maximum number of TRs from the maximum TR-ID manager.

16. A method of operating an electronic system including a host and a data storage device, the method comprising:

grouping a first transaction (TR) and a second TR into a multi-transaction, wherein the first TR associates a first set of atomic write data, and the second TR associates a second set of atomic write data;

assigning a first TR identification (TR-ID) to the first TR and assigning a second TR-ID to the second TR; and thereafter, communicating the first set of atomic write data to the data storage device, and storing each atomic write data in the first set of atomic write data in a first storage area of the data storage device together with the first TR-ID and a first identifier indicating whether the atomic write data is a last communicated atomic write data in the first set of atomic write data;

communicating the second set of atomic write data to the data storage device, and storing each atomic write data in the second set of atomic write data in the first storage area together with the second TR-ID and a second identifier indicating whether the atomic write data is a last communicated atomic write data in the second set of atomic write data; and thereafter, atomically writing a combination of the first set of atomic write data and the second set of atomic write data from the first storage area to a second storage area different from the first storage area only after determining that the communicating and storing of the first set of atomic data and the second set of atomic data were each successfully completed by referencing the first and second identifiers for each atomic write data respectively in the first set of atomic write data and the second set of atomic write data as stored in the first storage area.

17. The method of claim 16, further comprising:

executing a first application program on the host, such that the executing of the first application program defines the first set of atomic write data for the first TR;

by operation of the host, requesting a TR-ID from a transaction (TR) manager of the data storage device for the first TR; and receiving the TR-ID in the host from the TR manager, and then assigning the received TR-ID as the first TR-ID to the first TR by operation of the host.

18. The method of claim 17, further comprising:

executing a second application program on the host, such that the executing of the second application program defines the second set of atomic write data for the second TR;

by operation of the host, requesting another TR-ID from the TR manager for the second TR; and receiving the another TR-ID in the host from the TR manager, and then assigning the received another TR-ID as the second TR-ID to the second TR by operation of the host.

19. The method of claim 18, wherein the host comprises an application programming interface (API), and the requesting TR-IDs for the first TR and the second TR from the TR manager is made through the API.

20. The method of claim 16, further comprising:

executing a first application program on the host, such that the executing of the first application program defines the first set of atomic write data for the first TR; and by operation of the host, requesting a TR-ID from a transaction (TR) manager in operating on the host for the first TR, and then assigning the TR-ID provided by the TR manager as the first TR-ID to the first TR by operation of the host.

* * * * *